N. W. DALTON
AEROPLANE WING STRUCTURE.
APPLICATION FILED NOV. 10, 1917.
1,355,738.
Patented Oct. 12, 1920.
3 SHEETS—SHEET 1.
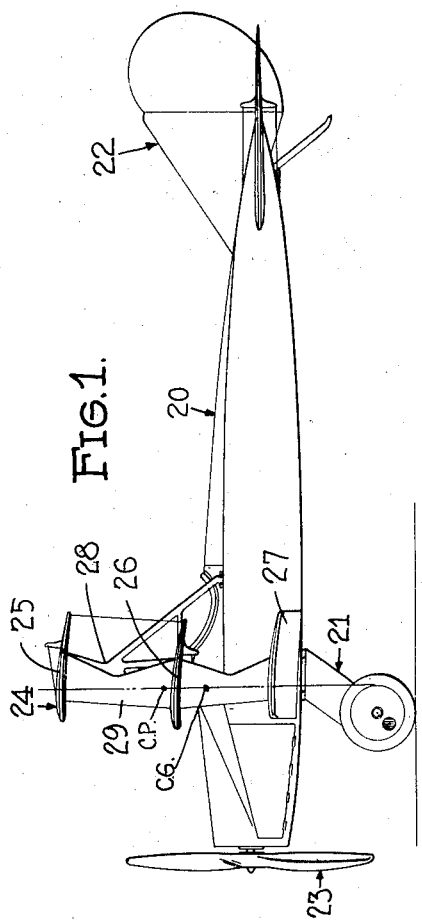
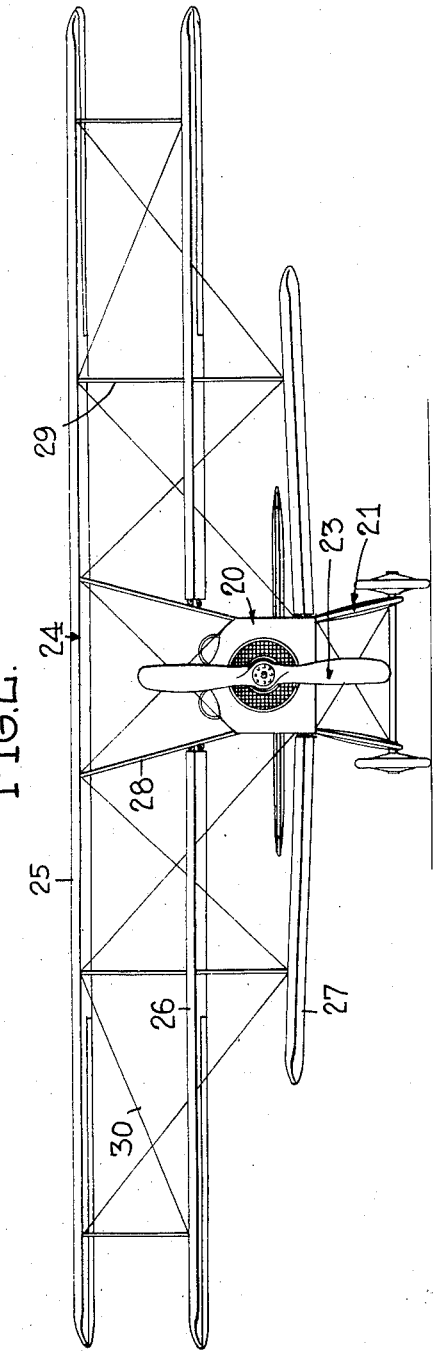
Inventor
NELSON W. DALTON
By
Attorney

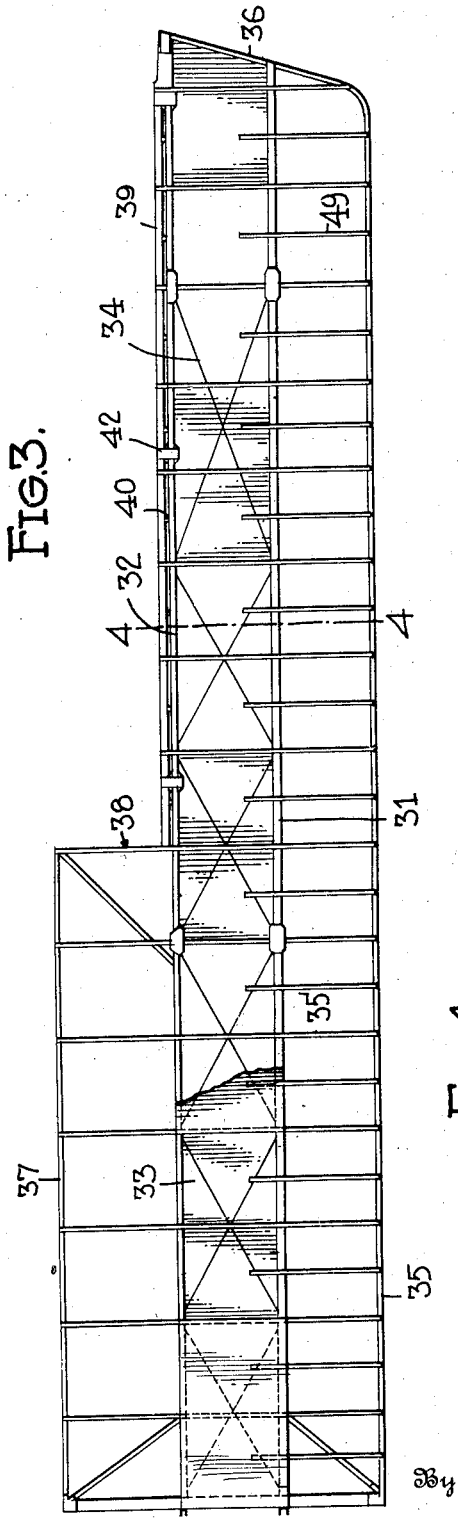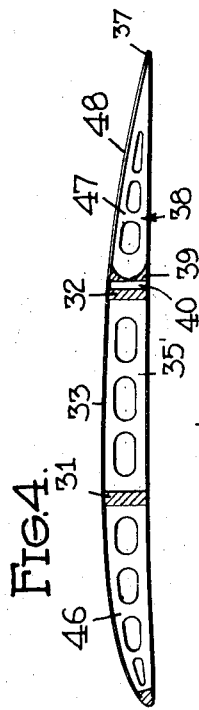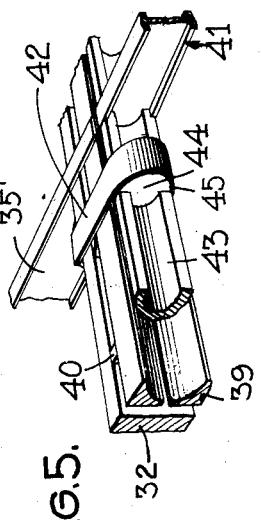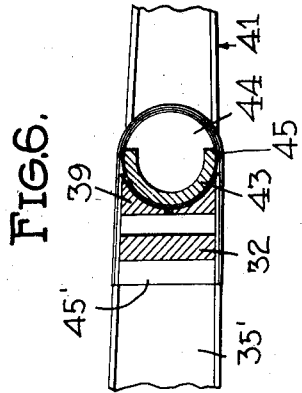

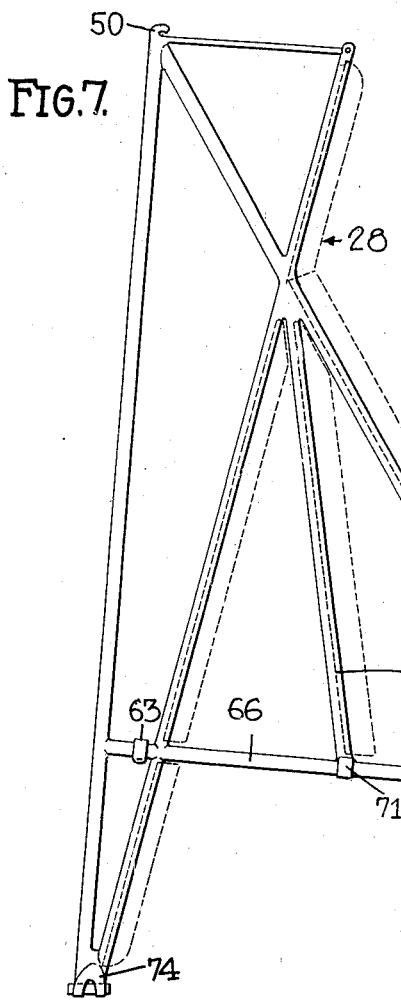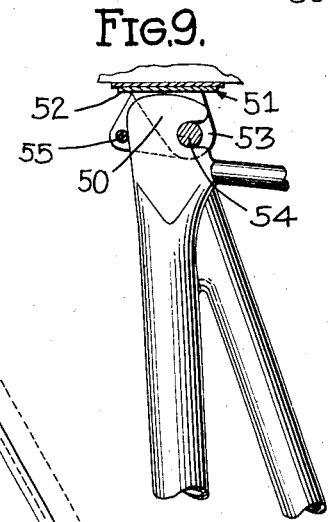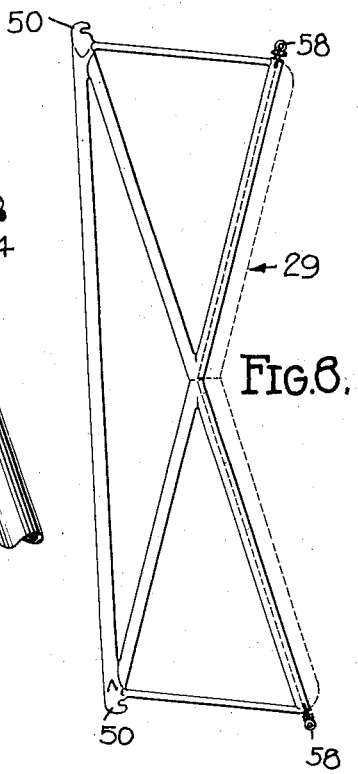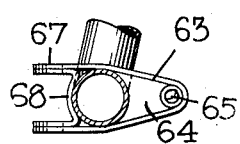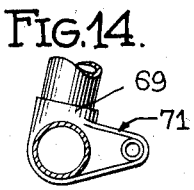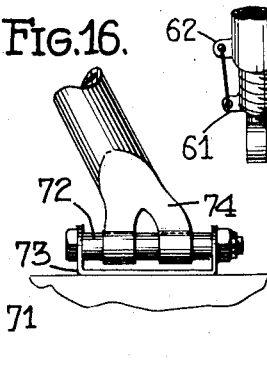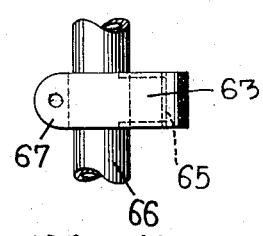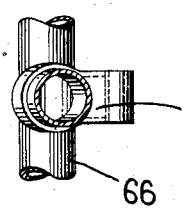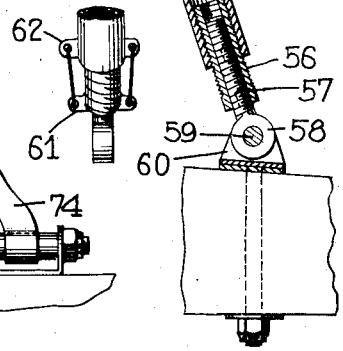

UNITED STATES PATENT OFFICE.

NELSON W. DALTON, OF BUFFALO, NEW YORK, ASSIGNOR TO CURTISS AEROPLANE & MOTOR CORPORATION, A CORPORATION OF NEW YORK.

AEROPLANE-WING STRUCTURE.

1,355,738.    Specification of Letters Patent.    Patented Oct. 12, 1920.

Application filed November 10, 1917. Serial No. 201,362.

*To all whom it may concern:*

Be it known that I, NELSON W. DALTON, a citizen of the United States, residing at Buffalo, in the county of Erie and State of New York, have invented certain new and useful Improvements in Aeroplane-Wing Structures, of which the following is a specification.

My invention relates to aeroplanes and is characterized principally by the removal of the front wing beam (where but two main beams are provided) rearwardly from its usual position to a position substantially above the foremost point of travel of the center of pressure. The wings are then single-wired in the plane of the beam and spaced apart by wing-posts having adjustable connection with the wings. With this adjustment it is entirely practical to use but the single-wiring without permanently distorting or warping the wings. Adjacent the leading edge, where the wires are placed, the wing posts have a rigid connection with the wings. Adjacent the trailing edge, however, adjustment is effected to supersede the wire pull and resulting adjustment where double-wiring has heretofore been used. This adjustment is also valuable in that a slight variation in the angle of incidence of the wings can be obtained with the result that any and all wing distortions can be completely eliminated even though a lack of uniformity in wing-post length or fitting construction exists. Moreover, by a single-wired wing structure a decreased resistance to flight is obtained.

Further characteristics of the invention such as the wing construction details and improved wing fittings will be hereinafter pointed out.

Of the drawings:

Figure 1 is a side elevation of an aeroplane embodying the features of novelty herein claimed.

Fig. 2 is a front end elevation of the machine illustrated in Fig. 1.

Fig. 3 is a plan view of one of the wings with its covering removed.

Fig. 4 is an enlarged cross section on a line 4—4 of Fig. 3.

Fig. 5 is a detail perspective view of the rear wing beam reinforcement together with attaching means for the aileron.

Fig. 6 is a view illustrating in section that portion of the wing and aileron illustrated in Fig. 5.

Figs. 7 and 8 are elevations of one of the center wing posts and outer wing posts respectively.

Fig. 9 is a detail vertical sectional view of one of the wing post fittings.

Fig. 10 is a similar view of an adjustable type of fitting.

Fig. 11 is a detail elevation of the fitting illustrated in Fig. 10.

Figs. 12 and 13 are detail views in side elevation and plan respectively of one of the wing hinges.

Figs. 14 and 15 are similar views illustrating in a like manner a somewhat similar although different form of hinge, and Fig. 16 is a detail elevation of the anchorage for the center wing posts.

The machine illustrated is possessed of the same general characteristics as the machine described and claimed in a co-pending application filed by me under date of February 8, 1917, Serial Number 147414. It comprises a fuselage or body 20, landing-gear 21, empennage 22, propeller 23 (tractor) and triplane wing structure 24. The wing structure, designated as an entirety, comprises an upper surface 25, an intermediate surface 26, lower surface 27, centrally located upwardly diverging wing posts 28 and outer or terminal wing posts 29. These wing posts 28 and 29 are each of substantially K-form. The center wing posts (see Fig. 7) are somewhat longer than the outer wing posts 29 in that they extend upwardly and slightly outwardly from the fuselage to the upper surface 25 and support intermediately the wings of the intermediate surface 26.

In the co-pending case, although K-struts are used, their connection with the wings is such that single-wiring cannot be effectually used. As above pointed out where but a single set of wires are used there is a tendency to permanently warp or distort the wings by reason of the wire pull at one locality only. A single wiring, however, is preferred. It not only cuts down head resistance during flight but permits of slight wing adjustment, i. e., a slight variation in the angle of incidence of the wings. This single wiring is cross ranged as usual and designated as an entirety by the numeral 30.

To utilize but a single set of wires it is further necessary that a modified type of wing be used. To this end the front wing beam of the wing structure (where but two main beams are provided) is removed from its usual position (ahead of the center of pressure) to a position only slightly in advance of or approximately in the plane of the foremost point of travel of said center. In Fig. 3 this wing construction is disclosed. The wing beam above referred to is designated 31. Instead of the conventional I-form it is given a rectangular cross-section as is also the rear wing beam 32. The two beams extend parallel and afford the principal foundation for the wing. Longitudinally the beams 31 and 32 are interconnected alternatingly at their top and bottom edges by laminated board coverings 33, and, if desired, intermediately by cross arranged wires 34. In addition to the connections 33 and 34 transverse ribs 35 are used. Where a greater number of beams are provided it is essential that one of them be located as stated.

The nose or leading edge strip 35 of the wing extends parallel with the beams 31 and 32 throughout the greater portion of its length. At its outer extremity it is bent to extend rearwardly and slightly outwardly as indicated at 36 for connection with the outer extremity of the rear wing beam 32. The trailing edge strip 37 is made shorter than the beam 32 that a jog 38 may be provided at the rear outer edge of the wing. This construction is more or less characteristic of the great majority of wing structures now used.

For the full length of the jog 38 the rear beam 32 is reinforced by quarter-round concaved strips 39 which extend parallel with the beam immediately behind it. Blocking 40 is utilized to space the strips 39 from the beam. These strips 39 together provide a longitudinally socketed reinforcing element, the socket being formed by the semi-circular concaved quarter round strips. Within this socket the entering or leading edge of the aileron designated as an entirety by the numeral 41, is seated.

Hinge-straps 42 are utilized for fastening the ailerons 41 to the wings. To afford a foundation for these straps 42 the leading edge strip 43 of the aileron is blocked at intervals throughout its length as at 44 and inclosed in a metal ring as at 45 to provide a metal bearing surface. As illustrated in Fig. 6 the strap 42 passes around this metal bearing surface and has its ends extended beyond both the reinforcement 39 and beam 32 for connection with suitable blocking 45' fastened to the beam. This hinge formation is such that the ailerons 41 may be biased either up or down.

The nose strip 35 and the forward wing beam 31 are connected by web-strips 46 alternatingly situated in alinement with and between the web-strips 35'. Similarly the rear wing beam 32 is connected with the trailing edge strip 37 except that the intermediately located web-strips are dispensed with and only those in alinement with the web-strips 35' used. These latter web-strips have been designated 47. Cap-strips 48 extend uninterruptedly from the nose strip 35 to the trailing edge strip 37 throughout approximately one-half of the wing length and from the nose strip 35 to the reinforcing strip 39 throughout the remaining length. These strips lie contiguous to and overlap the alined web-strips of the wing and constitute collectively a smooth bearing surface for the wing covering (not shown). The intermediately located web-strips at the leading edge of the wing are similarly capped by strips 49 which extend beyond the forward wing beam 31 to continue the added foundation for the wing covering beyond the plane of the beam. It is at the leading edge especially that this rigid foundation is most needed.

The wing posts being of K-form the usual two point fastening for the wings is retained. The forward fastening (detailed in Fig. 9) underlies the forward wing beam and is rigid, while the rear fastening underlies the rear beam and is adjustable. It is this combination of a rigid and adjustable fastening which makes it possible for the angle of incidence of the wings to be slightly varied. The intermediate wing posts 28 are provided at one end and the outer wing posts 29 at both ends with a hook-shaped member 50. The hook in each instance is directed toward the rear so that the wing post may be slipped in place rather easily. For each hook-end 50 a fitting 51 is provided. Each fitting is of the form best illustrated in Fig. 9. It comprises a substantially U-shaped plate 52 having its extensions 53 connected by retaining pins 54 over which the hook-end 50 of the strut or post is fitted. A locking-pin 55 is then extended across the front of the post or strut to prevent its displacement. This pin 55, unlike the pin 54, is removable.

The adjustable connection, although it may be provided upon one extremity of the central or intermediate wing posts is used only as specified last, i. e., upon both extremities of the outer wing posts 29. Said adjustable connection is somewhat akin to a turnbuckle in that its function is the same. It comprises a barrel 56 both interiorly and exteriorly threaded. The interior threads are preferably right hand and the exterior threads oppositely pitched. Within the barrel 56 the threaded shank 57 of an eye-bolt 58 is fitted. The outer threads of the barrel 56 engage directly with the wing post which is hollow, constructed of metal tubing, and interiorly threaded to receive the barrel. The use of an eye-bolt as an element of the turnbuckle admits of the desired pivotal action essential even to the slightest adjustment of the wings. A pin 59 carried by a fitting 60 and passing through the eye of the bolt 58 may be described as the preferred type of pivotal connection here used.

In a wing structure assembly the wing posts are slipped laterally in place with their hooked-ends engaging the retaining pins 54. After fastening the posts against displacement by the use of the pins 55 the wiring 30 is tightened and adjusted to straighten the wings in the plane of the foremost wing beam which, as above pointed out lies in approximately the plane of the foremost point of travel of the center of pressure of the wing. Having no rear wire adjustment a tightening or setting of the wings in the plane of the rear wing beams cannot be effected without some such substitute means as that disclosed in Fig. 10.

Ears 61 are formed upon the barrel 56 that adjustment with respect to the eye-bolt 58 and strut 28 can be effected. Ears 62 are also formed on the struts 28 or 29 to permit of an intertying of the struts and barrel. Accidental turning of the latter is in this way prevented.

Referring now to the details illustrated in Figs. 12 to 16 inclusive it will be noted that the wing hinges of Figs. 12 and 13 are similar, although somewhat different from the hinges illustrated in Figs. 14 and 15. The former wing hinges serve as anchorages for the forward wing beams of the intermediate wings 26. Said hinges comprise hinge-plates 63 of substantially U-form having their bight portions reinforced as at 64 and equipped with apertures 65 through which hinge pins (not shown) pass. The extensions of the hinges 63 continue beyond the cross brace 66 of the center strut to afford anchorages 67 for wires, should wires be used. Between the extensions 67 a compression piece 68 is disposed. The hinges for the rear wing beams of the intermediate wings, as suggested, are similarly formed except that instead of the anchorages 67 and compression member 68 a socket 69 is provided. Within this socket 69 is seated one end of a vertical brace 70 forming a part of the center of strut 28. Said hinge I have designated as an entirety by the numeral 71. The anchorages for the lower extremities of the center struts 28 are such that pivotal adjustment of these struts laterally may be effected. A pin 72 carried by a fitting 73 in turn fastened to the fuselage 20 is utilized as the anchoring means. Said pin passes through or rather penetrates the extremity of the strut 28 which is preferably bifurcated as at 74.

It will be noted that each of the various details herein described is an adjunct of the wing structure when considered as a whole. The rigid and adjustable connections above described coöperate with the single-wiring feature as does also the beam placement in the wings. It is to be understood, however, that this coördination of parts is only preferred and that if desired each of the various details may be separately used. It is intended that this invention shall cover these details whether used in combination or separately and that various modifications and changes may be made without departing from the generic spirit of the invention as claimed.

What I claim is:

1. In an airplane, a wing structure including superposed wings, wing posts arranged to interconnect and provide fore and aft points of support for the superposed wings, wiring for the wing structure extending longitudinally thereof in approximately the longitudinal vertical plane of the foremost point of travel of the center of pressure, said wiring constituting the only longitudinally extending wire connection between the superposed wings, and connections between the wing posts and wings, the connections between the wing posts and wings at the forward point of support of one wing being fixed and the connections between the wing posts and wings at the rear point of support of one wing being adjustable.

2. In an airplane, a wing structure including superposed wings, wing beams incorporated in the wings, one of the wing beams of each wing extending longitudinally thereof in approximately the transverse vertical plane of the foremost point of travel of the center of pressure, wing posts arranged to interconnect and provide fore and aft points of support for the superposed wings, the fore and aft connections between the wing posts and wings being respectively fixed and adjustable, and wiring for the wing structure extending longitudinally thereof in the longitudinal vertical plane of the wing beams located in the longitudinal vertical plane of the foremost point of travel of the center of pressure, said wiring constituting the only longitudinally extending wire connection between the wings.

3. In an airplane, a wing structure including superposed wings, wing posts arranged to interconnect and provide fore and aft points of support for the superposed wings, the connections between the wing posts and the wings being respectively fixed and adjustable, and wiring for the wing structure extending longitudinally thereof, the location and arrangement of the wiring being such that the placement of the wings may be varied by manipulation of the adjustable connection between the wing posts and wings without a variation in the wire lengths.

4. In an airplane, a wing structure including superposed wings, deep narrow wing posts arranged to interconnect and provide fore and aft points of support for the superposed wings, adjustable connections between the wing posts and wings, said adjustable connections constituting the rear points of support for the wings, and wiring for the wing structure extending longitudinally thereof, the said wiring being located in vertical alinement with the forward points of support of the wings to admit adjustment of the wings without varying the wire lengths.

5. In an aeroplane wing structure, wing beams, and veneer strips interconnecting said beams alternating adjacent the top and bottom edges thereof.

6. In an aeroplane wing structure, wing beams, and laminated board coverings connecting the wing beams alternatingly adjacent the top and bottom edges thereof.

7. In an airplane, superposed supporting surfaces, wing posts interconnecting the supporting surfaces, one of the posts being deep and narrow and provided with separate connections located respectively fore and aft of the longitudinal center lines of one of the wings, and means for varying the effective length of one of said connections without correspondingly varying to the effective length of the other.

8. In an aeroplane, superposed supporting surfaces, wing posts of substantially K-form interconnecting said surfaces, and adjustable connections intermediate the angular extensions of the K-posts and wings.

9. An aeroplane including a wing, a wing post, and a knock-down connection between the wing and post comprising a retaining means, and a means movable laterally into and out of locking engagement therewith.

10. In an aeroplane, a wing, a wing post having a hook-shaped end, and a retaining means mounted upon the wing for engagement with the post.

11. In an aeroplane, a wing, a wing post, a hook formed upon one end thereof, a retaining means mounted upon the wing to engage the hook, and means engaging the post to lock the hook and retaining means together.

12. A biplane or multiplane wing structure including wing beams arranged to extend longitudinally of each wing respectively fore and aft of its longitudinal center line, the forward wing beam in each instance being situated approximately above the foremost point of travel of the center of pressure of the wing, wing posts interconnecting adjacent wings, the wing posts being of substantially K-form, the angular extensions of the K-posts having an adjustable connection with the rear wing beams and the straight portions having a fixed connection with the front wing beams, together with wiring for the wing structure arranged to extend longitudinally thereof in the vertical plane of the beams to which the straight portions of the wing posts are fastened.

13. A biplane or multiplane wing structure including wing beams arranged to extend longitudinally of each wing respectively fore and aft of its longitudinal center line, wing posts interconnecting adjacent wings, the wing posts being of substantially K-form; the angular extensions of the K-posts connecting with the rear wing beams and the straight portions with the front wing beams, the connection between the extensions of the wing posts and the rear wing beams being of an adjustable character and the connections between the straight portions of the wing posts and the front wing beams being of a non-adjustable character, together with wiring for the wing structure arranged to extend longitudinally thereof in the vertical plane of the forward beams, said wiring constituting the only longitudinally extending wire connection between the wings whereby the relative placement of the latter may be varied.

14. A biplane or multiplane wing structure including wing beams arranged to extend longitudinally of each wing respectively fore and aft of its longitudinal center line, the forward wing beams in each instance being situated approximately above the foremost point of travel of the center of pressure of the wing, wing posts connecting the corresponding beams of adjacent wings, the forward wing beams of adjacent wings being rigidly connected and the rear wing beams adjustably connected, together with wiring for the wing structure arranged to extend longitudinally thereof in the vertical plane of the forward beams, said wiring constituting the only longitudinally extending wire connection between adjacent wings.

15. A biplane or multiplane wing structure including wing beams arranged to extend longitudinally of each wing respectively fore and aft of its longitudinal center line, wing posts interconnecting adjacent wings, the construction of the wing posts being such that a rigid connection between the forward wing beams and an adjustable connection between the rear wing beams is provided, and wiring for the wing structure arranged to extend longitudinally thereof in the vertical plane of the forward wing beams, the arrangement of the wiring being such that the relative placement of the wings may be varied without varying in any way the wire lengths.

16. In an airplane, superposed airplane wings, and a wing post connected at two points with one wing and also connected with the other wing, the connections between the wing posts and wings first mentioned being respectively fixed and adjustable.

In testimony whereof I hereunto affix my signature.

NELSON W. DALTON.